United States Patent [19]
Dunbar

[11] 3,784,035
[45] Jan. 8, 1974

[54] VEHICLE MOUNTED LOADING HOIST

[76] Inventor: Glenn G. Dunbar, 2608 Overbrook Dr., Toledo, Ohio

[22] Filed: Apr. 17, 1972

[21] Appl. No.: 244,414

[52] U.S. Cl.............................. 214/75 H, 212/145
[51] Int. Cl............................................. B60p 1/54
[58] Field of Search.............. 214/75 R, 75 G, 75 H, 214/730, 670; 212/145

[56] References Cited
UNITED STATES PATENTS

| | | | |
|---|---|---|---|
| 3,494,489 | 2/1970 | Kruger | 214/75 H |
| 2,661,854 | 12/1953 | Adams | 214/75 H |
| 3,501,031 | 3/1970 | Whitfield | 214/75 H |
| 2,857,062 | 10/1958 | Anderson | 214/75 H |
| 3,338,426 | 8/1967 | Grove | 212/145 |
| 2,958,538 | 11/1960 | Norris et al. | 212/145 |
| 3,632,001 | 1/1972 | Richens | 214/16.4 A |
| 2,812,868 | 11/1957 | Crile | 214/75 H |

FOREIGN PATENTS OR APPLICATIONS

| | | | |
|---|---|---|---|
| 124,083 | 11/1959 | U.S.S.R. | 214/670 |

Primary Examiner—Robert G. Sheridan
Assistant Examiner—Lawrence J. Oresky
Attorney—Carl F. Schaffer et al.

[57] ABSTRACT

The invention is a vehicle mounted loading hoist for use with a vehicle having a pair of spaced parallel rails positioned on a load carrying bed. A carriage is positioned for movement along the rails and a hoist is mounted on the carriage. The carriage includes a pair of axles mounting wheels which ride on the rails. A motor is positioned at one side of the carriage and drive chains on that side of the carriage are connected from the motor to the axles to selectively drive the loading hoist along the rails. An outrigger assembly is provided on the carriage. The outrigger assembly includes a mechanism for adjusting the positions of a pair of outrigger legs both horizontally and vertically. The outrigger legs may also be moved between storage and operative positions.

5 Claims, 8 Drawing Figures

PATENTED JAN 8 1974
3,784,035
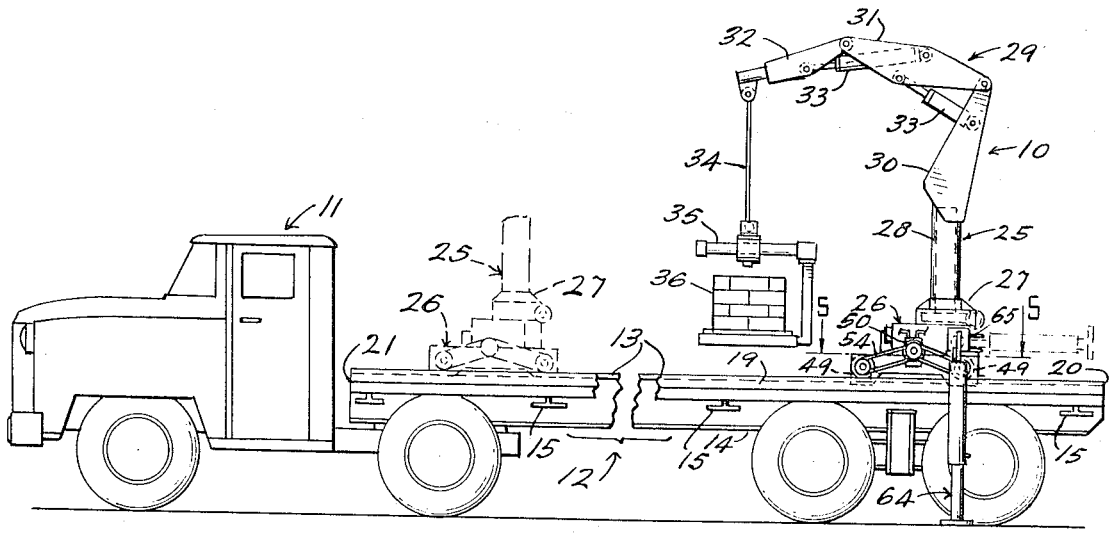
FIG-1-
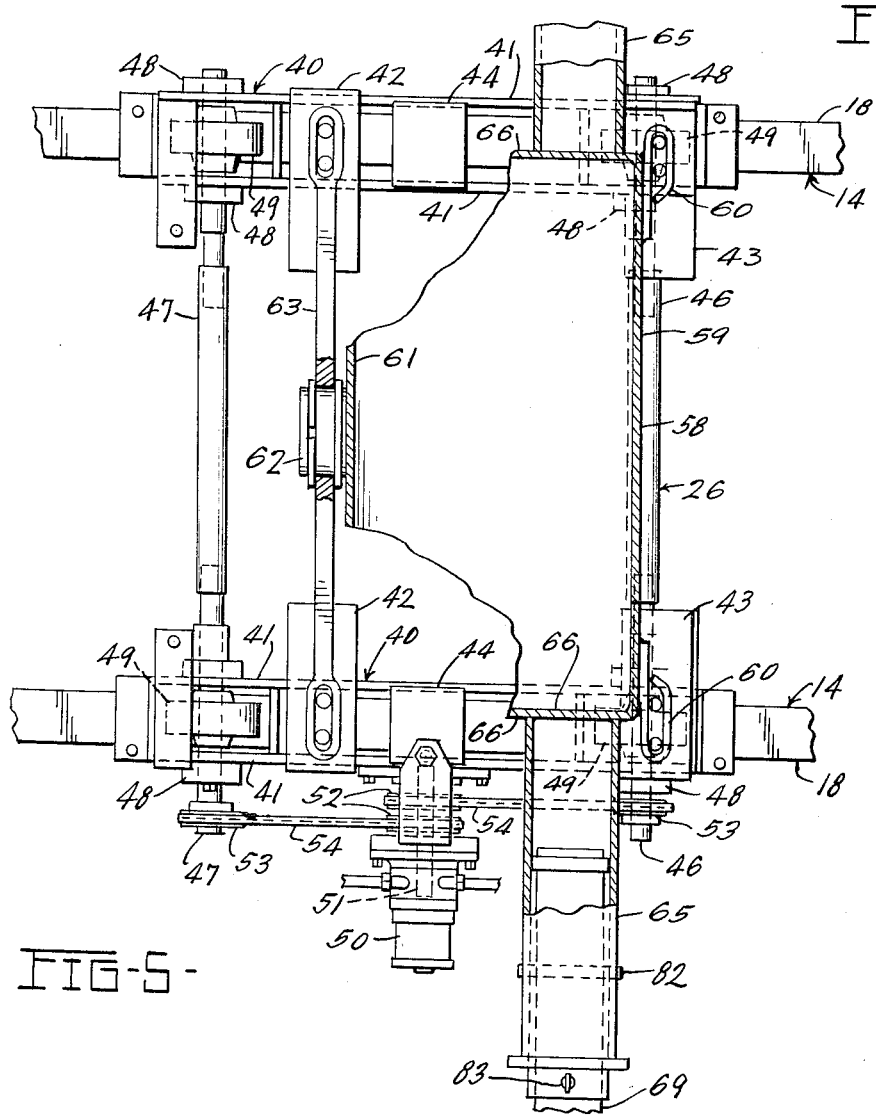
FIG-5-

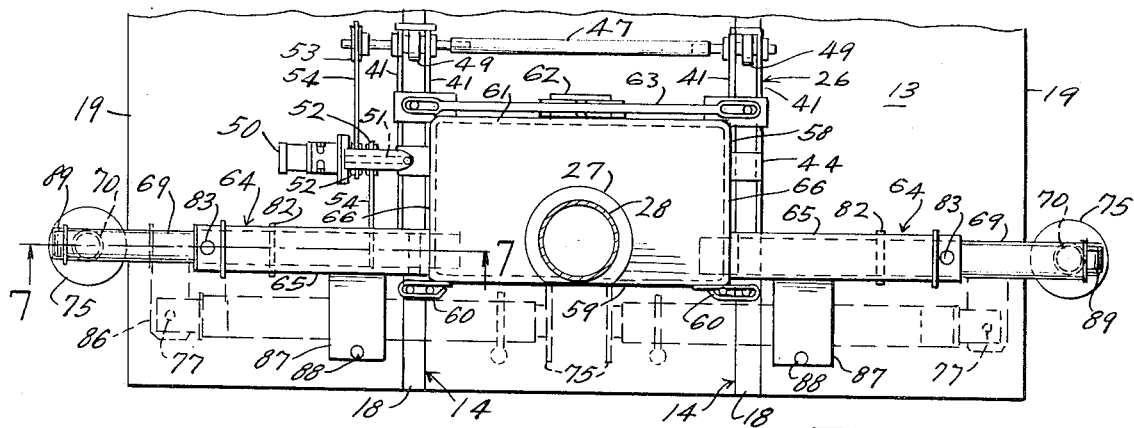

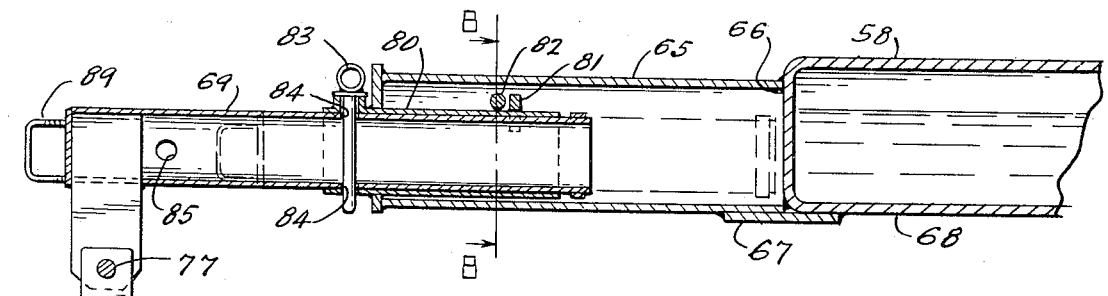
FIG-7-
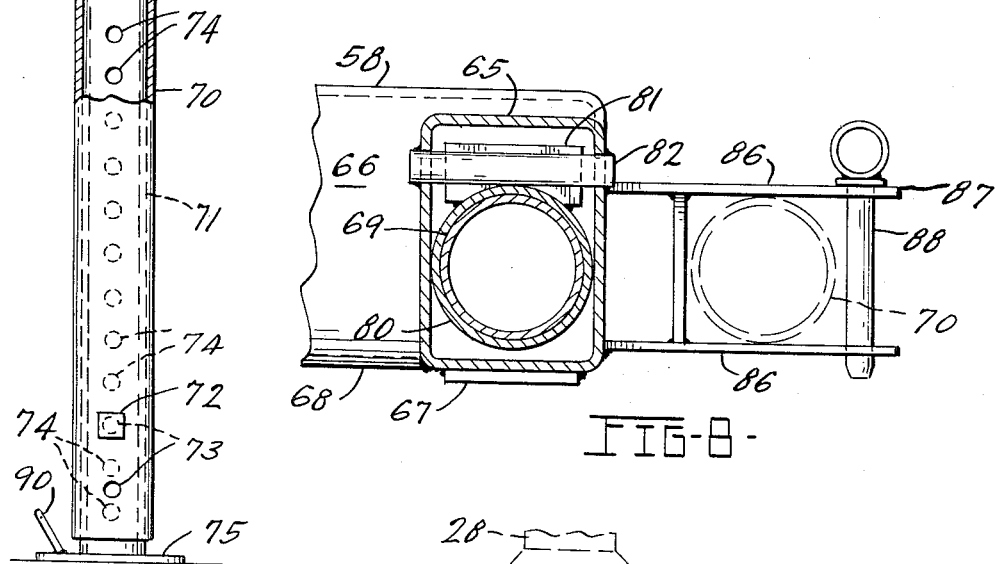
FIG-8-
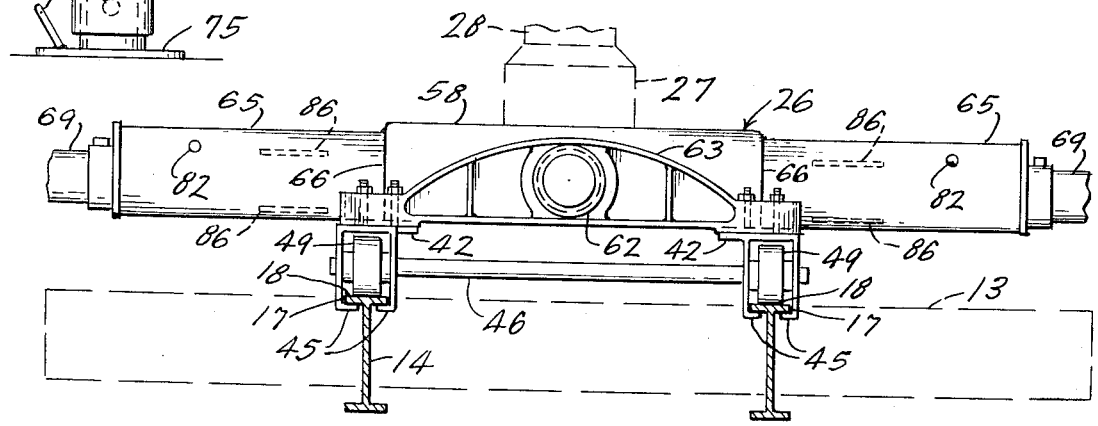
FIG-4-

VEHICLE MOUNTED LOADING HOIST

BACKGROUND OF THE INVENTION

The present invention relates to self-loading and unloading vehicles and more particularly to an improved loading hoist which is mounted on vehicles having a load carrying bed. Vehicle mounted loading hoists are known to the art and the present invention is an improvement of, for example, the vehicle mounted loading hoist shown in U.S. Pat. No. 3,547,284 granted Dec. 15, 1970.

One of the problems with prior art vehicle mounted loading hoists is that the operator had to use caution with respect to extending a hoist boom to positions spaced from the sides of the vehicle bed. This problem was compounded when the hoist was used to lift heavy loads or the vehicle was at a construction site and, for example, was located on a portion of hilly land as opposed to a paved loading area. Some vehicles are provided with jacks or outriggers to reduce this problem. However, such outriggers often support the vehicle at only one fixed position adjacent the end of the vehicle. Where the loading hoist is movable, it may not be located above the supported portion of the vehicle. Furthermore, the forces exerted on the mounting means which attaches the loading hoist to the vehicle may be extremely high in such vehicles.

Another problem with prior art vehicle mounted loading hoists which move along a load carrying bed occurs when drive mechanisms for moving such loading hoists do not provide the immediate response necessary for the hoist operator to coordinate the movement of the hoist along the vehicle bed as a boom mechanism of the loading hoist is simultaneously moved.

SUMMARY OF THE INVENTION

The present invention is directed to an improved carriage for a vehicle mounted loading hoist which moves along a pair of spaced parallel rails in a load carrying bed of a vehicle. The carriage includes a pair of axles mounted in axle boxes which fit over the spaced rails. Wheels are mounted on each axle to engage the rails. A motor is positioned at one side of the carriage and drives chains which are connected to drive the axles for selectively moving the carriage along the rails. The carriage is also provided with an outrigger assembly. The outrigger assembly includes a pair of outrigger legs which extend horizontally from the carriage and vertically for engaging the ground on opposite sides of the vehicle load carrying bed. The outrigger legs are designed such that they may be folded onto the carriage for storage. Since the outrigger legs are mounted directly on the carriage, the loading hoist will be stabilized for all positions of the carriage on the vehicle bed. Furthermore, stresses in the means connecting the carriage to the rails will be reduced, regardless of the location of the carriage on the vehicle.

Accordingly, a preferred object of the present invention is to provide an improved loading hoist for mounting on a load carrying bed of a vehicle.

Another object of the invention is to provide an improved carriage for a vehicle mounted loading hoist which includes an outrigger assembly for stabilizing such loading hoist.

Still another object of the invention is to provide an improved drive for a vehicle mounted loading hoist.

Other objects and advantages of the invention will become apparent from the following detailed description, with reference being made to the accompanying drawings.

BRIEF DESCRIPTION OF THE DRAWINGS

FIG. 1 is a fragmentary, side elevational view of a vehicle including a vehicle mounted loading hoist according to the present invention and showing in dashed lines an alternative position of the loading hoist carriage;

FIG. 2 is an enlarged fragmentary end view of the vehicle of FIG. 1 and showing the vehicle mounted hoist according to the present invention;

FIG. 3 is a fragmentary vertical sectional view taken along line 3—3 of FIG. 2;

FIG. 4 is an enlarged vertical fragmentary section taken along line 4—4 of FIG. 3;

FIG. 5 is a fragmentary horiztontal sectional view taken along line 5—5 of FIG. 1;

FIG. 6 is a fragmentary horizontal sectional view of the carriage for a vehicle mounted loading hoist according to the present invention;

FIG. 7 is an enlarged fragmentary vertical cross section of an outrigger assembly for a vehicle mounted loading hoist according to the present invention; and FIG. 8 is a fragmentary vertical section taken along line 8—8 of FIG. 7.

DESCRIPTION OF THE PREFERRED EMBODIMENT

Referring to FIGS. 1 and 2, a vehicle mounted loading hoist according to the present invention is generally indicated by the reference number 10. The loading hoist 10 is mounted on a vehicle including a tractor 11 and a trailer 12. The trailer 12 has a load carrying bed 13. The load carrying bed 13 of the trailer 12 includes a pair of longitudinally extending I-beams 14 and a plurality of laterally spaced girders 15 which intersect and are welded to the I-beams 14. Wood planking 16 is positioned on the girders 15 and forms the upper surface of the bed 13. The I-beams 14 have upper flanges or rails 17 with upper surfaces 18 on which the loading hoist 10 rides. The rails 17 are positioned inwardly from side edges 19 of the bed 13 a predetermined distance. The bed 13 has a rear end 20 and a front end 21 and the rails 17 extend from the rear end 20 to the front end 21. Stops (not shown) may be provided at the ends 20 and 21 adjacent the rails 17 to retain the loading hoist 10 on the load carrying bed 13.

The loading hoist 10 generally comprises a boom or hoist assembly 25 and a carriage 26. The hoist assembly 25 is mounted on the carriage 26 to ride along the rails 17 in the load carrying bed 13. The hoist assembly 25 includes a base 27 for attachment to the carriage 26 by any conventional means, as by welding or bolting. A mast 28 extends vertically upwardly from the base 27 and supports a movable boom 29. In the present embodiment, the boom 29 has several articulated sections 30, 31 and 32. The boom 29 rotates relative to the mast 28. Movement of the boom sections 31 and 32 is controlled by a pair of hydraulic cylinders 33. A rack and pinion drive assembly (not shown) controls the rotational movement between the mast 28 and the boom 29. A cable 34 is shown connected to the boom 29 and mounts a load engager 35 at its lowermost end. The load engager 35 shown in FIG. 1 is preferably of the kind and structure shown in my U.S. Letters Patent No.

3,239,072, although other conventional load engagers such as a hook or a grapple may also be used. The load engager 35 may be attached to the cable 34 with a swivel. In FIG. 1, the load engager 35 is shown moving a pallet loaded with concrete blocks 36 from a position adjacent the rear end 20 of the bed 13.

Turning now to FIGS. 2-6, the carriage 26 is shown in detail. The carriage 26 includes a pair of axle boxes 40 having spaced side members 41 interconnected by two mounting brackets 42 and 43 and a member 44. Inwardly directed shoes 45 are formed on the lower edge of the side members 41 for engaging the upper flanges or rails 17 of the I-beams 14 when the carriage 26 is tipped. A pair of axles 46 and 47 extend between ends of the axle boxes 40 and are mounted to rotate in bearings 48. Wheels 49 are attached to each end of the axles 46 and 47 on the portion of the axles located between the side members 41 of the axle boxes 40 such that the wheels 49 ride on the upper surfaces 18 of the rails 17.

A motor 50, such as a hydraulic motor, is provided for driving the wheels 49 to move the carriage 26 along the rails 17. The motor 50 has a driven shaft 51 to which a pair of sprockets 52 are attached. Sprockets 53 are also attached to one end of each of the axles 46 and 47. A pair of chains 54 are connected between the sprockets 52 and the sprockets 53 such that the axles 46 and 47 are rotated by the motor 50. As the axles 46 and 47 are rotated, the wheels 49 move the carriage 26 along the rails 17.

A base 58 is attached to the axle boxes 40 for mounting the boom or hoist assembly 25. An end 59 of the base 58 is bolted to the mounting brackets 42 on the axle boxes 40 by means of a pair of brackets 60. An opposite end 61 of the base 58 is connected through a tubular flange 62 to a bracket 63 which is bolted to the mounting brackets 42 on the axle boxes 40. The flange 62 is permitted to rotate by a small degree within the bracket 63 so that all four of the wheels 49 will normally ride on the upper surface 18 of the rails 17. In a preferred embodiment of the invention, the base 58 is in the form of a closed rectangular box which serves as a reservoir for holding hydraulic fluid. A conventional hydraulic pump (not shown) may be used for delivering fluid under pressure from the reservoir base 58 to the motor 50 and to the hydraulic cylinders 33 for moving the carriage 26 and for operating the boom assembly 25.

According to the present invention, a pair of outrigger assemblies 64 are attached to the base 58 for stabilizing the loading hoist 10 while lifting either a heavy load or a load spaced at an extreme distance from either side 19 of the vehicle load carrying bed 13. A pair of channels 65 are welded to opposite sides 66 of the base 58 for mounting the outrigger assemblies 64. Reinforcing plates 67 are also welded between the bottom of each channel 65 and a bottom 68 of the base 58 to strengthen the joints between the channels 65 and the base 58, since these joints may be subjected to extreme stresses.

Each outrigger assembly 64 includes an upper tubular section 69 and an adjustable leg consisting of an outer section 70 and an inner section 71 which telescopes into the outer section 70. A pin 72 is provided to connect the outer and inner sections 70 and 71 through selected holes 73 in the outer section 70 and holes 74 in the inner section 71. When the outrigger assemblies 64 are in an operational position, as is best shown in FIG. 2, the holes 73 and 74 through which the pin 72 is passed are selected such that a foot 75 on the lower end of the inner section 71 of each outrigger assembly 64 contacts the ground 76. The outer leg section 70 is connected to the upper tubular section 69 by means of a pin 77. The pin 77 permits the leg sections 70 and 71 to pivot with respect to the upper section 69 so that the leg sections 70 and 71 may be vertically oriented, even though the trailer 12 is located on an inclined or irregular surface at a construction site.

As best seen in FIGS. 7 and 8, a tube 80 is welded to the channel 65 to telescopically receive the upper tubular section 69 of the outrigger assembly 64. A flange 81 is connected to the tube 80 and a pin 82 is attached to the channel 65 to contact the flange 81 and the tube 80, thereby restraining the tube 80 from vertical or axial movement within the channel 65. In attaching the tube 80 to the channel 65, consideration must be given to the width of the trailer 12. Therefore, the tube 80 may be attached to the channel 65 in the field, after the loading hoist is delivered to a purchaser.

A removable pin 83 is provided for selectively locking the tubular section 69 to the tube 80. Two pairs of holes 84 and 85 are provided in the tubular section 69 for receiving the pin 83. The pin 83 passes through the holes 84, as shown in FIG. 7, when the outrigger assembly 64 is in an operating position and the pin 83 passes through the holes 85 when the outrigger assembly 64 is retracted or folded for storage.

The method of storing the outrigger assemblies 64 is best shown in FIGS. 6 and 8. The pin 83 is removed from the holes 84 in the tubular section 69 and the outrigger assembly is rotated 90° such that the leg sections 70 and 71 extend horizontally. The tubular section 69 is then telescoped into the tube 80 and the pin 83 is inserted through the holes 85, thereby locking the leg sections 70 and 71 in a horizontal position adjacent the channel 65. The leg sections 70 and 71 are subsequently pivoted on the pin 77 until the feet 75 are adjacent the end 59 of the base 58. In this position, the outer leg section 70 is located between sides 86 of a retaining bracket 87. A pin 88 is inserted in the retaining bracket 87 to lock the outrigger assembly 64 in the storage position, as shown in dashed lines in FIG. 6. When the outrigger assemblies 64 are in the folded or storage position, they occupy very little space and will not extend beyond the normal depth of the carriage 26 or beyond the width of the load carrying bed 13. It will be apparent that the outrigger assemblies 64 do not diminish the load carrying area of the trailer bed 13. To facilitate moving the outrigger assemblies 64 between the storage position and an operating position, handles 89 are provided on the tubular sections 69 and handles 90 are provided on the feet 75.

It will be appreciated that various changes and modifications may be made in the above-described loading hoist without departing from the spirit and the scope of the claimed invention. The design of the hoist or boom assembly 25, for example, may be modified by attaching any commercially available hoist assembly to the carriage 26.

What I claim is:

1. In a vehicle mounted loading hoist for use with a vehicle having a load carrying bed, such vehicle having a pair of spaced parallel rails extending along the length of such bed, and wherein said loading hoist includes a hoist assembly mounted upon a carriage for movement along such rails, an improved carriage for such hoist assembly comprising, in combination, a base for mounting said hoist assembly, axle assemblies depending from said base and having wheels for engaging such rails, means for rotating at least one of said wheels to drive said carriage along said rails, and outrigger means attached to said carriage, said outrigger means being movable between a ground engaging position and a storage position, and means for retaining said ground engaging means in the storage position, said ground engaging means including means for moving said ground engaging means in a lineal direction towards and away from said carriage whereby said ground outrigger means extends beyond opposite sides of the load carrying bed in the ground engaging position and said outrigger means does not extend beyond such sides of the load carrying bed in the storage position, said ground engaging means also including a horizontal extendible outrigger means and a vertically swingable and longitudinally extensible leg means pivotally attached at a pivot below said outrigger means, whereby said leg means is swung to a storage position parallel to said horizontal outrigger means.

2. In a vehicle mounted loading hoist, an improved carriage, as set forth in claim 1, wherein said rotating means comprises a pair of drive sprockets, means attaching one of said sprockets to each axle, a hydraulic motor having a driven shaft, a pair of sprockets attached to said shaft, and a pair of drive chains, one of said chains connecting the sprocket on one axle to the one sprocket on said shaft and the other chain connecting the sprocket on the other axle to the other sprocket on said shaft.

3. Apparatus, according to claim 1, wherein said horizontal extendible outrigger means comprises a horizontal receiving member operatively connected to said base and a horizontal telescoping member received by said horizontal receiving member.

4. Apparatus, according to claim 1, wherein said extensible leg means comprises an outer leg section pivotally attached below said horizontal extendible outrigger means and an inner leg section received by said outer leg section.

5. Apparatus, according to claim 4, including means for adjusting the length of the extensible leg means.

* * * * *